(12) United States Patent
Ito

(10) Patent No.: US 10,455,099 B2
(45) Date of Patent: Oct. 22, 2019

(54) PRINTING APPARATUS WITH PULL SCAN FUNCTION, METHOD OF CONTROLLING PRINTING APPARATUS, AND STORAGE MEDIUM

(71) Applicant: CANON KABUSHIKI KAISHA, Tokyo (JP)

(72) Inventor: Chie Ito, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/747,819

(22) Filed: Jun. 23, 2015

(65) Prior Publication Data

US 2015/0381833 A1    Dec. 31, 2015

(30) Foreign Application Priority Data

Jun. 30, 2014    (JP) ................ 2014-135383

(51) Int. Cl.
   *G06F 15/00*    (2006.01)
   *H04N 1/00*    (2006.01)

(52) U.S. Cl.
   CPC ............... *H04N 1/00233* (2013.01)

(58) Field of Classification Search
   CPC .................................. H04N 1/00485
   USPC ........................................ 358/1.15
   See application file for complete search history.

(56) References Cited

U.S. PATENT DOCUMENTS

| 2003/0208607 A1 | 11/2003 | Yamazaki |
| 2009/0161132 A1 | 6/2009 | Sato |
| 2009/0168098 A1* | 7/2009 | Tanaka .................. G06K 15/00 358/1.15 |
| 2010/0128331 A1* | 5/2010 | Hamano ............ H04N 1/00795 358/505 |
| 2011/0096360 A1 | 4/2011 | Fujita |
| 2012/0250079 A1* | 10/2012 | Kobayashi ......... H04N 1/00411 358/1.15 |
| 2013/0250327 A1* | 9/2013 | Saitoh ................ H04N 1/00225 358/1.13 |

FOREIGN PATENT DOCUMENTS

| CN | 101686298 A | 3/2010 |
| CN | 101742043 A | 6/2010 |
| CN | 102710881 A | 10/2012 |
| JP | 2004-215009 A | 7/2004 |
| JP | 2005-277584 A | 10/2005 |
| JP | 2010-081377 A | 4/2010 |
| JP | 2011-209943 A | 10/2011 |
| JP | 2012-205235 A | 10/2012 |

OTHER PUBLICATIONS

Machine translation of Japanese Patent Document No. 2011-209943, Arimoto, Oct. 20, 2011 (Year: 2011).*

* cited by examiner

*Primary Examiner* — Mark R Milia

(74) *Attorney, Agent, or Firm* — Canon U.S.A., Inc. IP Division

(57) ABSTRACT

Regarding a Pull Scan function, a printing apparatus allows a user to select either employing a method for displaying a specific screen in using the Pull Scan function, or employing a method for permitting the use of the Pull Scan function even without displaying the specific screen.

8 Claims, 12 Drawing Sheets

COPY SCREEN 300

COPY SETTING SCREEN 310

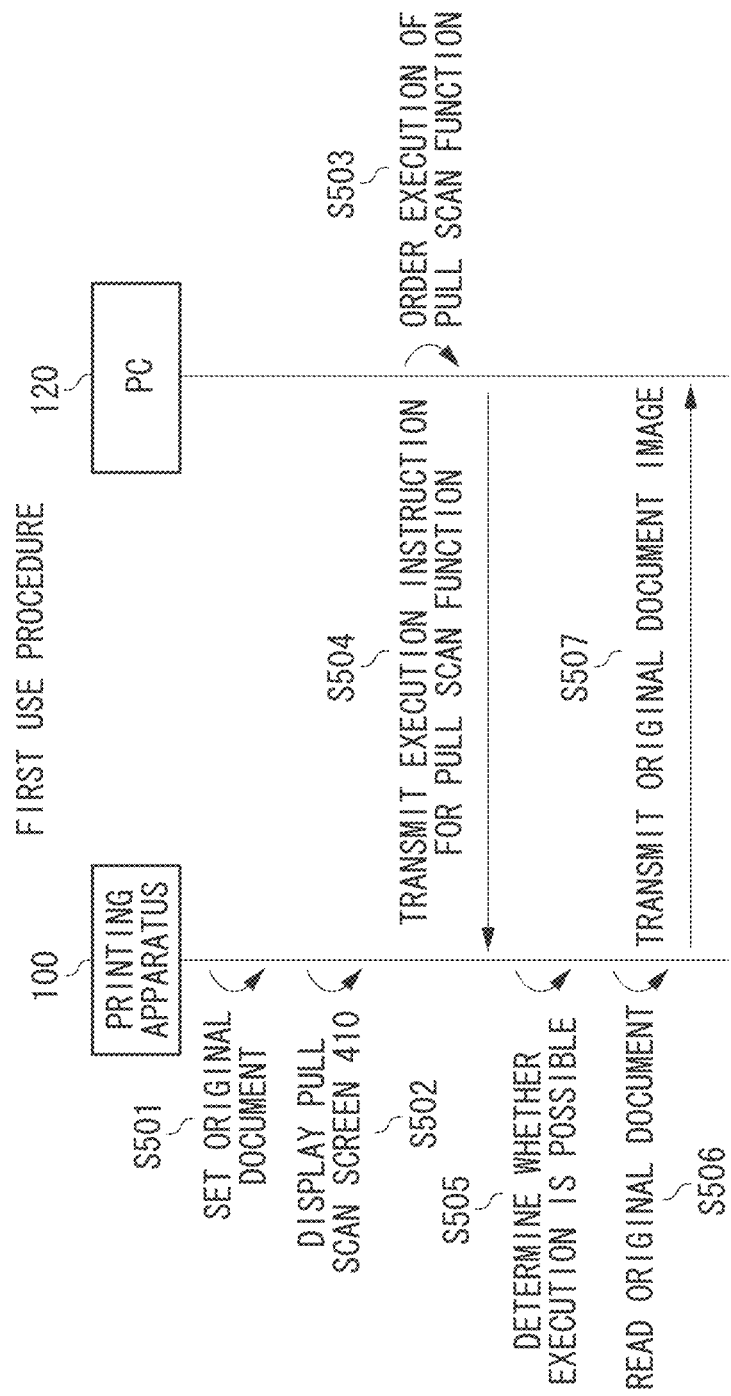

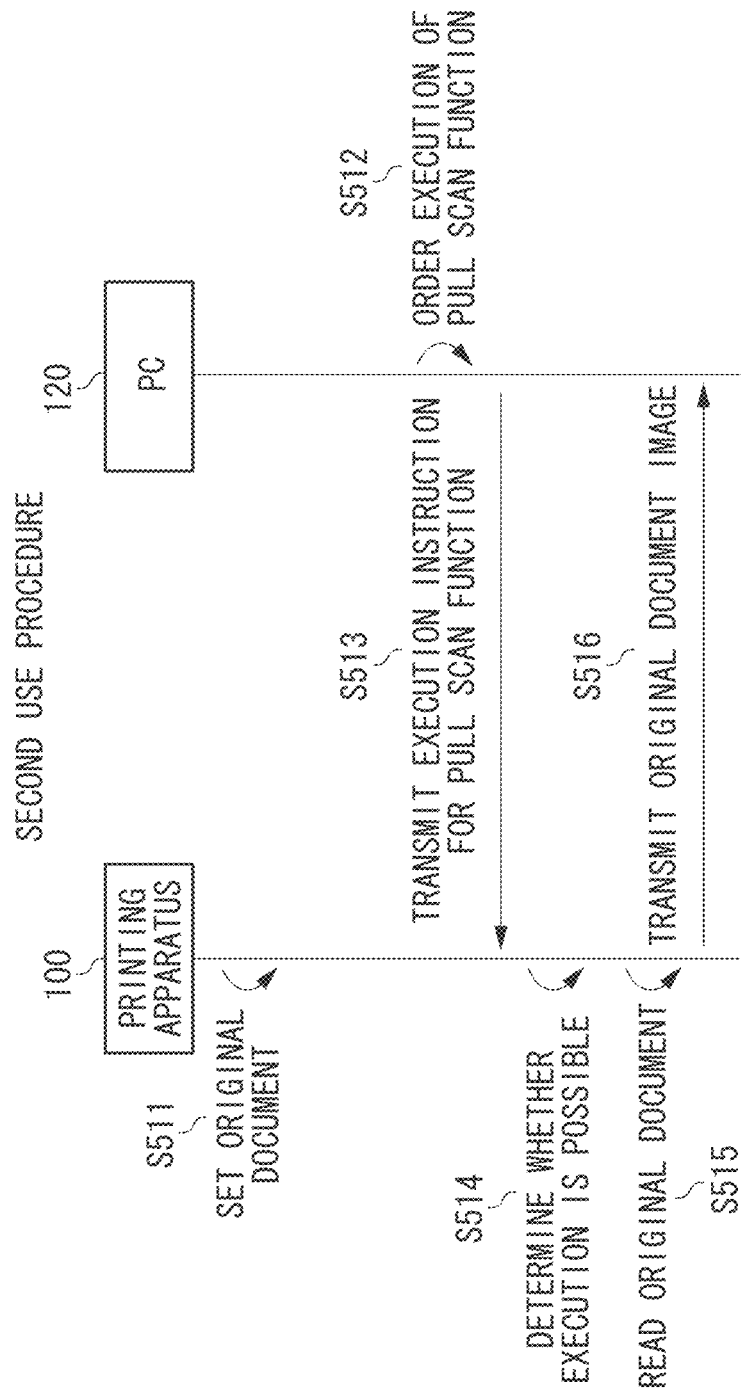

FIG. 9

| SCREEN ID | SCREEN |
|---|---|
| 001 | MENU SCREEN 200 |
| 002 | COPY SCREEN 300 |
| 003 | SEND SCREEN 320 |
| 004 | PULL SCAN SCREEN 410 |

PERMISSION SCREEN TABLE   900

PRINTING APPARATUS WITH PULL SCAN FUNCTION, METHOD OF CONTROLLING PRINTING APPARATUS, AND STORAGE MEDIUM

BACKGROUND OF THE INVENTION

Field of the Invention

The present invention relates to a printing apparatus with a Pull-Scan function, a method for controlling the printing apparatus, and a storage medium.

Description of the Related Art

There is known a technique used in a document scanning apparatus such as a printer provided with a scanner, for receiving a scan instruction from an external apparatus such as a host computer, and reading an original document according to the received scan instruction, and further, transmitting an original document image to the external apparatus. This technique is called "Pull Scan (PullScan)" function, and various document scanning apparatuses support this PullScan function.

Japanese Patent Application Laid-Open No. 2005-277584 discusses a configuration for shifting a document scanning apparatus to an online state by pressing an online button, in preparation for using the PullScan function. The document scanning apparatus discussed in Japanese Patent Application Laid-Open No. 2005-277584 can execute the PullScan function by shifting to the online state.

In using the PullScan function, a user A first moves from a host computer to the document scanning apparatus, and then sets an original document at the document scanning apparatus. The user A then returns to the host computer, and instructs, from the host computer, the document scanning apparatus to read the original document. While the user A is returning to the host computer after setting the original document at the document scanning apparatus, a user B different from the user A may use the document scanning apparatus. The user B is unlikely to know that the original document has been set at the document scanning apparatus by the user A to use the PullScan function. Accordingly, the user B may remove the original document set at the document scanning apparatus to use the document scanning apparatus to carry out his work.

Therefore, according to the conventional document scanning apparatus, the user A causes the document scanning apparatus to display a specific screen (for example, an online screen showing the online state), and then returns to the host computer. The user A's returning to the host computer after displaying the screen in this way can notify other users including the user B that the original document set at the document scanning apparatus is a document set to use the PullScan function.

As described above, conventionally, the user returns to the host computer after causing the document scanning apparatus to display the specific screen when using the PullScan function. However, the operation of displaying the specific screen consumes time for the user.

SUMMARY OF THE INVENTION

The present invention is directed to providing a Pull Scan function capable of reducing the work of a user.

According to an aspect of the present invention, a printing apparatus has a Pull Scan function of reading an original document according to an execution instruction received from an external apparatus, and transmitting an original document image obtained by reading the original document to the external apparatus, and the printing apparatus includes a display unit configured to display a screen, a setting unit configured to set, as a setting for the Pull Scan function, one of a first setting in which a user needs to display a specific screen for executing the Pull Scan function, and a second setting in which a user does not need to display the specific screen for executing the Pull Scan function, a receiver unit configured to receive an execution instruction for the Pull Scan function from the external apparatus, and a determination unit configured to determine whether to execute the Pull Scan function, based on the screen displayed by the display unit, and the setting made by the setting unit, in a case where the receiver unit receives the execution instruction.

According to another aspect of the present invention, a printing apparatus has a Pull Scan function of reading an original document according to an execution instruction received from an external apparatus and transmitting an original document image obtained by reading the original document to the external apparatus, and the printing apparatus includes a display unit configured to display a screen, a receiver unit configured to receive an execution instruction for the Pull Scan function from the external apparatus, and a determination unit configured to determine whether to execute the Pull Scan function, based on the screen displayed by the display unit, in a case where the receiver unit receives the execution instruction, wherein the determination unit determines to execute the Pull Scan function, in a case where the screen displayed by the display unit is a copy screen for a copy function, and wherein the determination unit determines not to execute the Pull Scan function, in a case where the screen displayed by the display unit is a setting screen for the copy function.

Further features of the present invention will become apparent from the following description of exemplary embodiments with reference to the attached drawings.

BRIEF DESCRIPTION OF THE DRAWINGS

FIGS. 5A and 5B are diagrams each illustrating a use procedure of the Pull Scan function.

FIG. 9 is a diagram illustrating a permission screen table.

DESCRIPTION OF THE EMBODIMENTS

An exemplary embodiment of the present invention will be described below, with reference to the accompanied drawings. The following exemplary embodiment is not intended to limit the invention according to the scope of claims, and any combination of features described in the exemplary embodiment is not necessarily essential to a solution of the invention.

Figure 1:
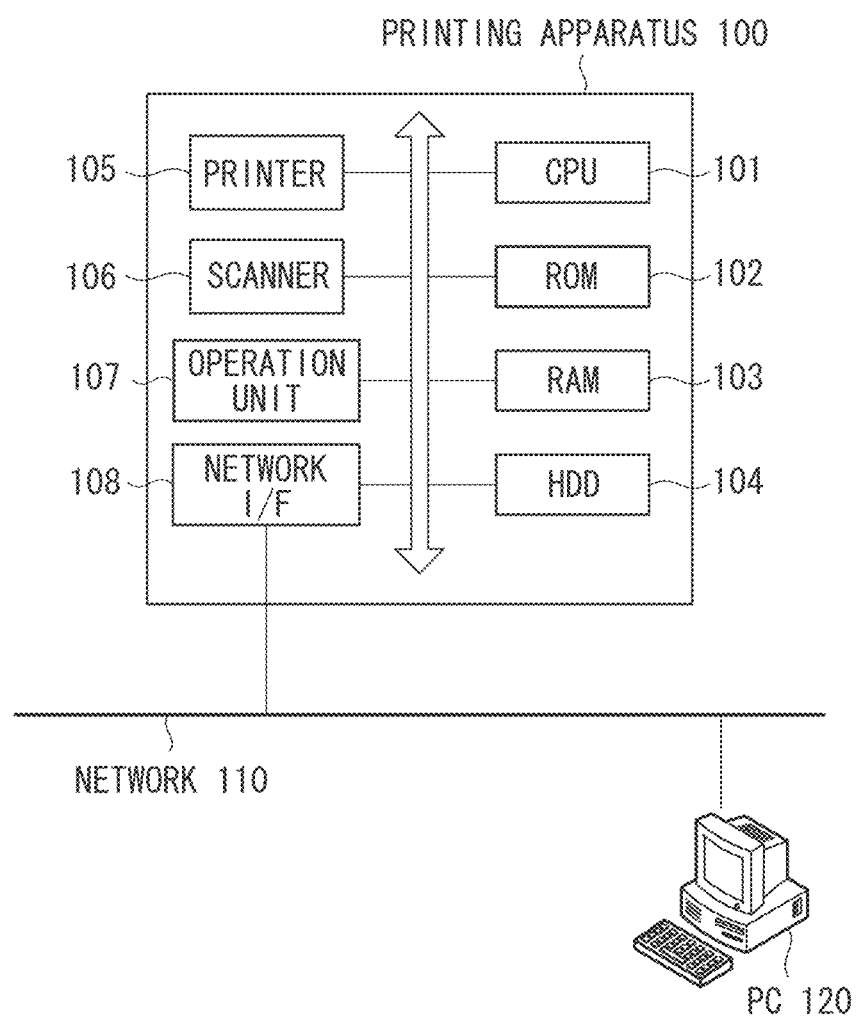
FIG. 1 is a diagram illustrating a configuration of a printing apparatus.

The exemplary embodiment of the present invention will be described below. A configuration of a system and a printing apparatus 100 according the present exemplary embodiment will be described with reference to FIG. 1.

The system according the present exemplary embodiment includes the printing apparatus 100, a personal computer (PC) 120, and a network 110. The printing apparatus 100 and the PC 120 can communicate with each other via the network 110. The printing apparatus 100 includes a scanner 106. The scanner 106 generates an original document image by reading an original document. The printing apparatus 100 can receive a scan instruction from the PC 120, read an original document according to the scan instruction, and transmit an original document image obtained by reading the original document, to the PC 120. Such a function, i.e. the function of reading an original document according to a scan instruction received from an external apparatus and transmitting an original document image to the external apparatus, is referred to as "Pull Scan function". When using the Pull Scan function, a user sets an original document on the printing apparatus 100, returns to the PC 120, and then transmits a scan instruction to the printing apparatus 100 from the PC 120.

Next, a configuration of the printing apparatus 100 will be described.

A central processing unit (CPU) 101 reads out a control program stored in a read only memory (ROM) 102 and executes various kinds of processing for controlling operation of the printing apparatus 100. The ROM 102 stores the control program. A random access memory (RAM) 103 is used as a temporary storage area serving as a main memory or a work area for the CPU 101. A hard disk device (HDD) 104 stores various kinds of data such as original document images and user settings.

In the printing apparatus 100, the CPU 101, i.e., a single CPU, is configured to execute each process in each flowchart to be described below. However, other mode may be adopted. For example, a plurality of CPUs working together can execute each process in each flowchart to be described below.

A printer 105 executes printing on a sheet based on print data such as a print job received from an external apparatus and an original document image generated by the scanner 106. The scanner 106 generates an original document image by reading an original document. The original document image generated by the scanner 106 is printed by the printer 105, and/or stored in the HDD 104.

An operation unit 107 includes a liquid crystal display section having a touch panel function, and a keyboard. The operation unit 107 displays various screens to be described below. The user can input instructions and information into the printing apparatus 100 via the operation unit 107.

A network interface (I/F) 108 is connected to the network 110, and communicates with an external apparatus. The network I/F 108 may be a wired I/F connecting to a local area network (LAN), or may be a wireless I/F executing wireless communication. The network I/F 108 receives a print job transmitted from the external apparatus, and the printer 105 executes printing based on the received print job. When the printing apparatus 100 executes the Pull Scan function, the network I/F 108 transmits an original document image generated by the scanner 106 to the external apparatus that is a sender of a scan instruction.

The printing apparatus 100 according to the present exemplary embodiment is an example of a document scanning apparatus provided with a scanner, however, an apparatus to which the present exemplary embodiment can be applied is not limited to printing apparatuses. The present exemplary embodiment can also be applied to, for example, a network scanner with no printing function, besides the printing apparatuses.

Next, an operation screen to be displayed by the operation unit 107 will be described. A menu screen 200 in FIG. 2, which is displayed by the operation unit 107, is used by the user to select a desired function from among various functions provided by the printing apparatus 100. The user can use a copy function by selecting (by touching, in the case of the touch panel) a button 201 in the menu screen 200. Further, the user can use a send function by selecting a button 202 in the menu screen 200. Furthermore, the user can use the Pull Scan function by selecting a button 203 in the menu screen 200. The user can make various settings in the printing apparatus 100 by selecting a button 204 in the menu screen 200.

Figure 3A:
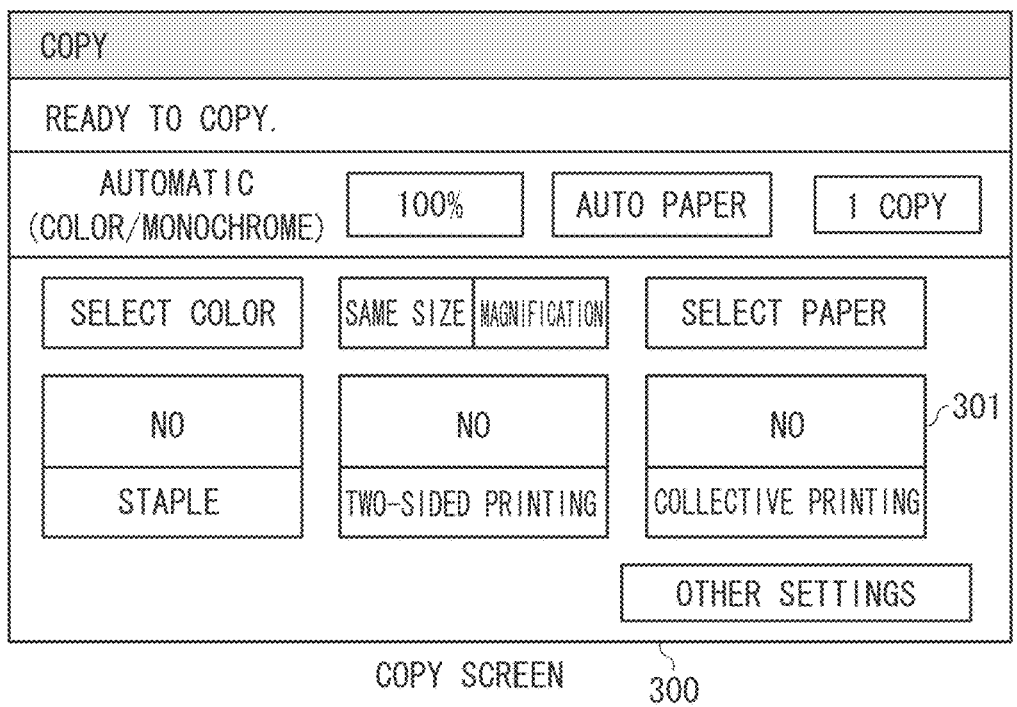
FIGS. 3A, 3B, 3C, and 3D are diagrams each illustrating a screen displayed by the printing apparatus.
Figure 3B:
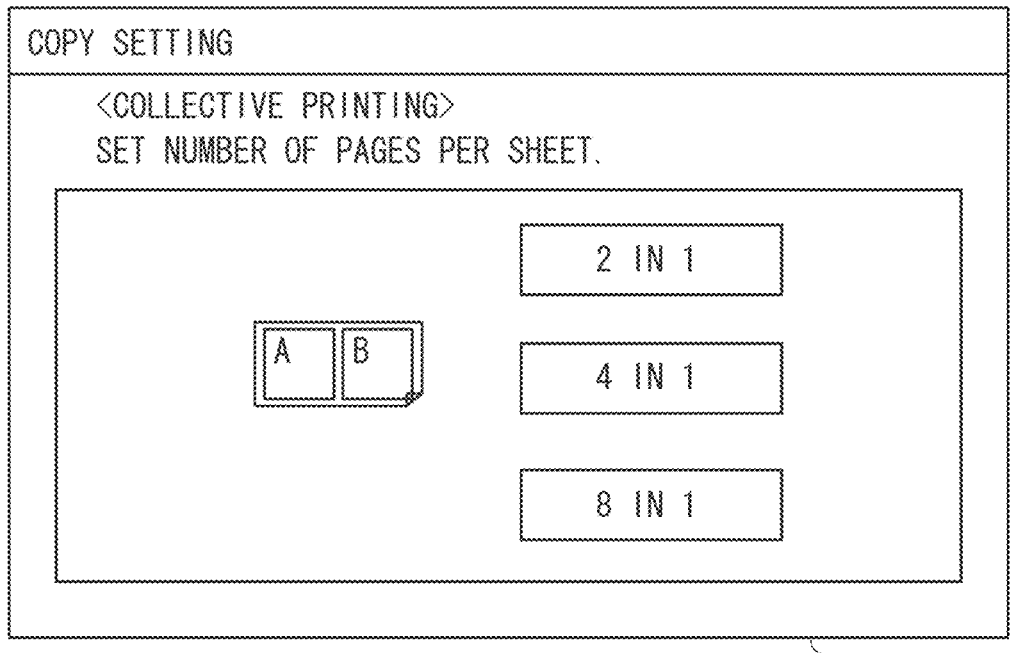

When the user selects the button 201 in the menu screen 200, the operation unit 107 displays a copy screen 300 as illustrated in FIG. 3A. The copy screen 300 is provided for the user to use the copy function, and presents basic function screen of the copy function. The user can set various copy settings via the copy screen 300. For example, when the user selects a button 301, the operation unit 107 displays a copy setting screen 310 as illustrated in FIG. 3B. The copy setting screen 310 in FIG. 3B displays collective printing setting, as an example. A screen similar to the copy setting screen 310 is displayed for other copy setting as well. When the user presses a copy execution button not illustrated, after selecting desired copy options, the printing apparatus 100 executes the copy function.

Figure 3C:
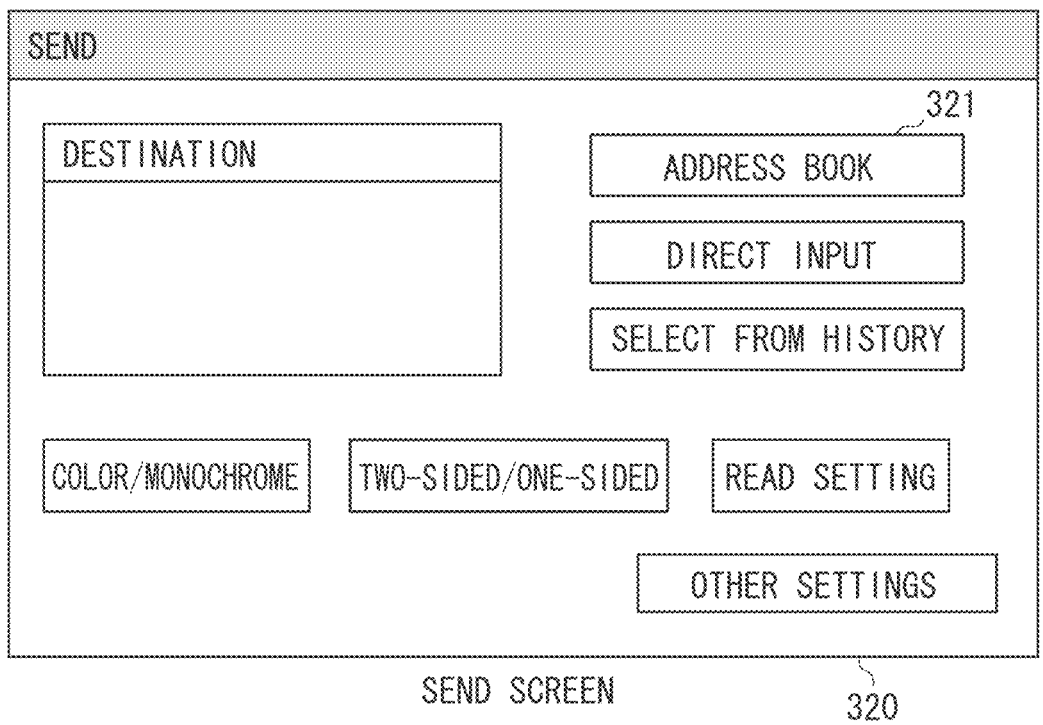
Figure 3D:
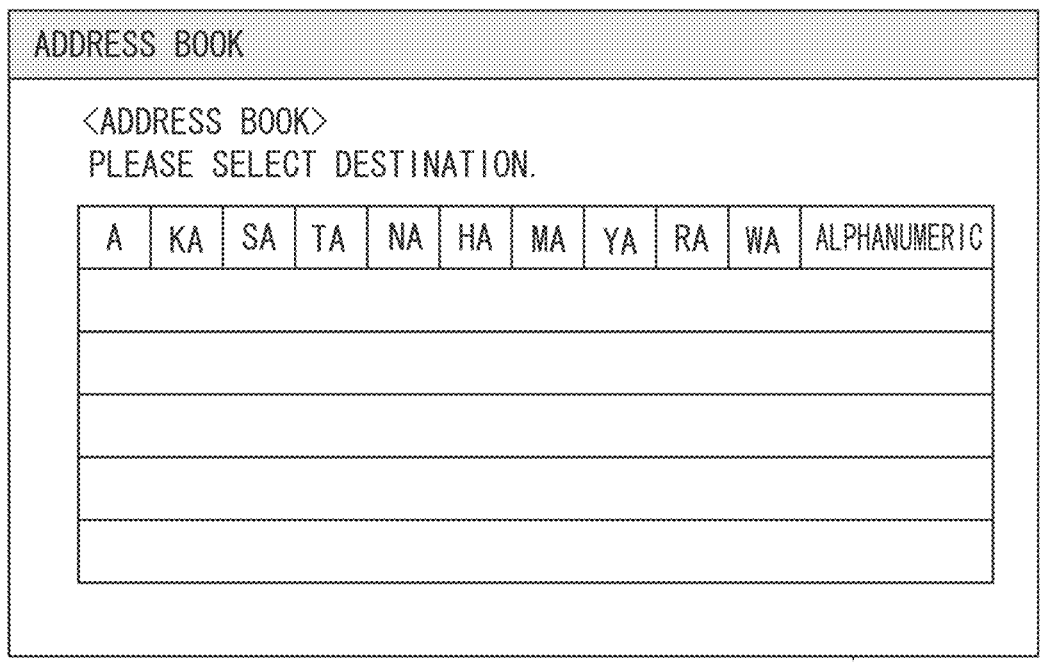

When the user selects the button 202 in the menu screen 200, the operation unit 107 displays a send screen 320 as illustrated in FIG. 3C. The send screen 320 is provided for the user to use the send function, and presents a basic function screen of the send function. The send function transmits an original document image or an image stored in the HDD 104 to a designated destination. In the send screen 320, the user can make various kinds of send settings. For example, when the user selects a button 321, the operation unit 107 displays a send setting screen 330 as illustrated in FIG. 3D. The send setting screen 330 in FIG. 3D designates a destination by using an address book, as an example. A screen similar to the send setting screen 330 is displayed for other send setting as well. When the user presses a send execution button (not illustrated) after selecting desired send settings, such as a destination setting and a read setting, the printing apparatus 100 executes the send function.

Figure 2:
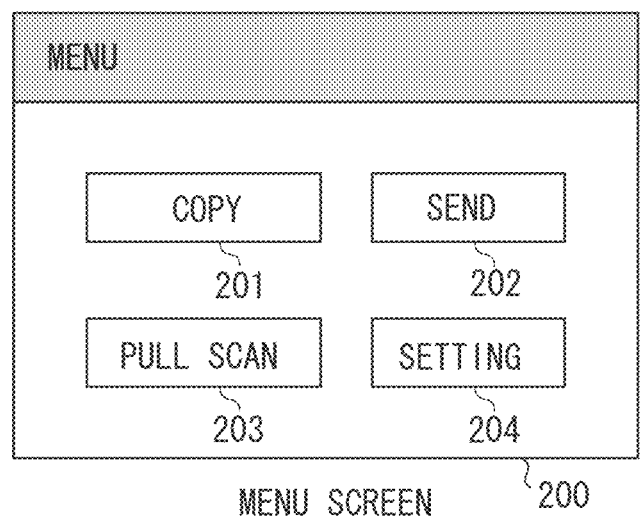
FIG. 2 is a diagram illustrating a menu screen.
Figure 4A:
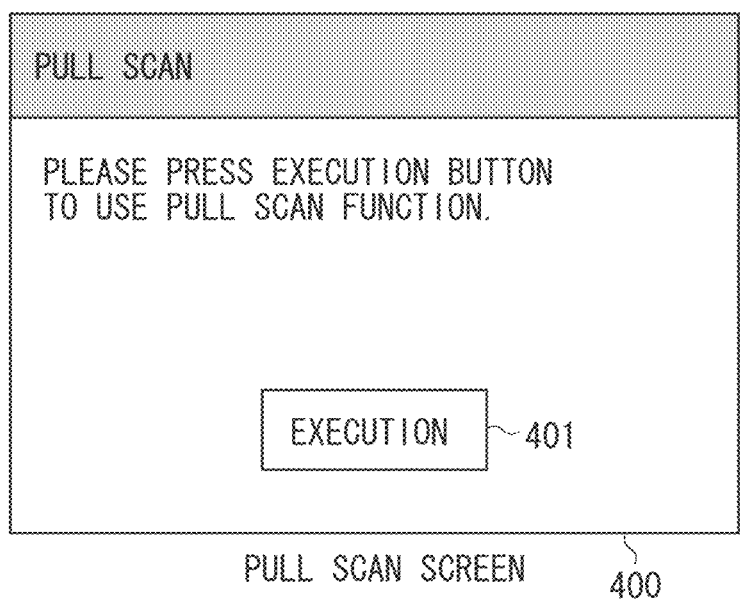
FIGS. 4A and 4B are diagrams each illustrating a screen for a Pull Scan function.

An operation procedure when the user uses the Pull Scan function will be described with reference to FIGS. 4A and 4B. When the user selects the button 203 in the menu screen 200 as illustrated in FIG. 2, the operation unit 107 displays a Pull Scan screen 400 as illustrated in FIG. 4A. To use the Pull Scan function, the user sets an original document on the scanner 106 of the printing apparatus 100, and returns to a user's PC (e.g., the PC 120). In other words, the user moves away from the printing apparatus 100, leaving original document set on the printing apparatus 100. Accordingly, it is desirable to notify other users that execution of the Pull Scan function is about to begin. For this reason, in the present exemplary embodiment, the user first selects a button 401, to use the Pull Scan function. When the button 401 is selected, the operation unit 107 displays a Pull Scan screen 410 as illustrated in FIG. 4B.

Figure 4B:
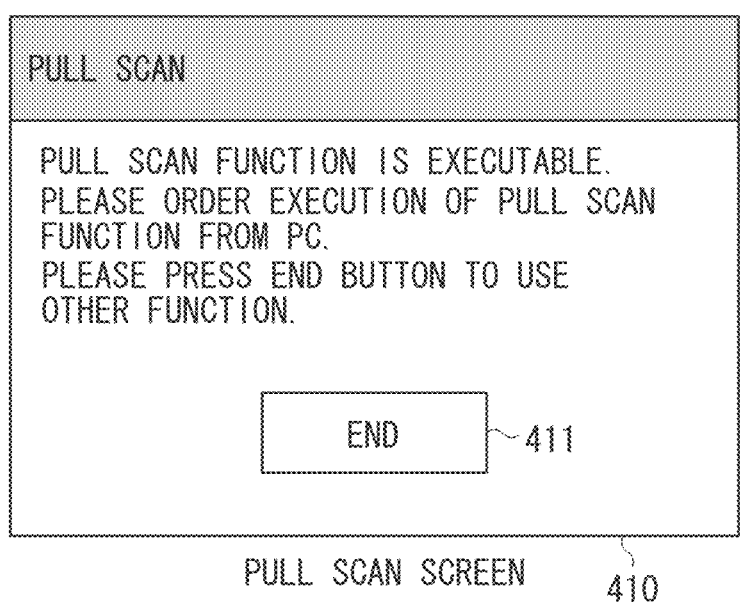

The Pull Scan screen 410 as illustrated in FIG. 4B indicates that the Pull Scan function is executing. As a result, for example, when a user A leaves the printing apparatus 100 after displaying the Pull Scan screen 410, a user B can notice that another user is using the Pull Scan function, by viewing the Pull Scan screen 410. When the use of the Pull Scan function is completed or when another user desires to use other functions, a button 411 may be selected.

Figure 6A:
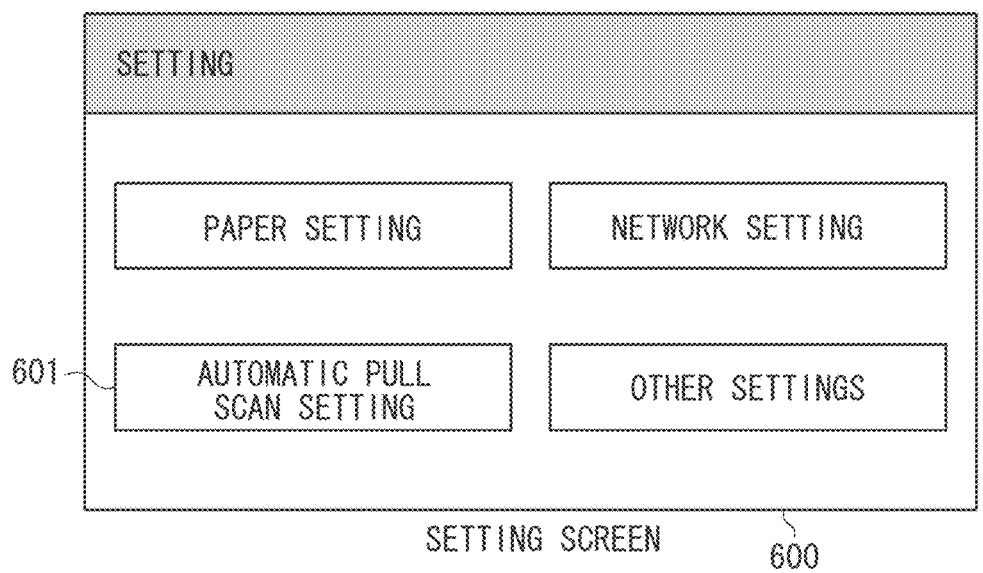
FIGS. 6A, 6B, and 6C are diagrams each illustrating a setting screen.
Figure 6B:
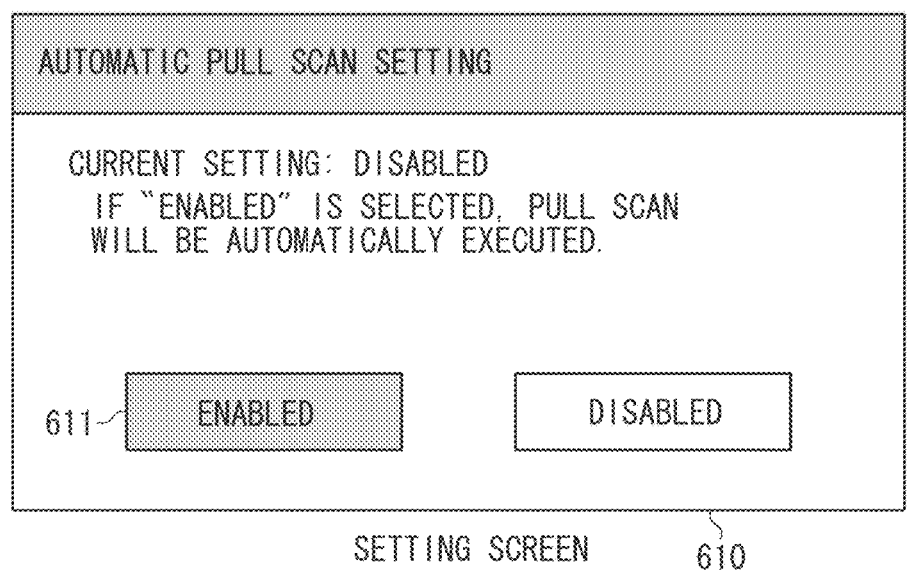
Figure 6C:
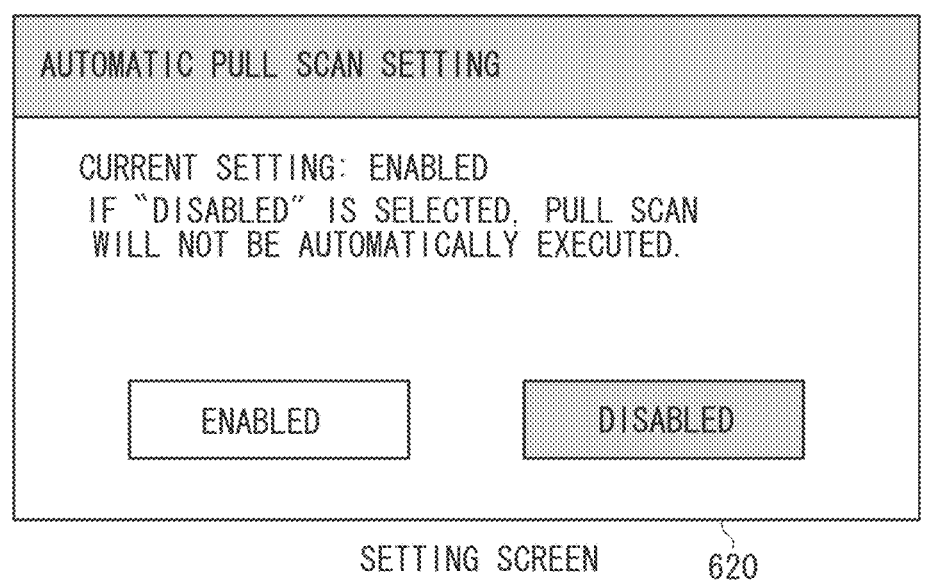

Further, when automatic Pull Scan setting, which will be described below with reference to FIGS. 6A, 6B, and 6C, is set to "DISABLED", execution of the Pull Scan function is permitted on condition that the operation unit 107 displays the Pull Scan screen 410. In other words, the execution of the Pull Scan function is not permitted, when the operation unit 107 displays a screen different from the Pull Scan screen 410, e.g., the menu screen 200 or the copy screen 300. For example, if the Pull Scan function is executed while the operation unit 107 is displaying the copy screen 300, the scanner 106 may read an original document that is not intended by a user who has given an instruction to execute the Pull Scan function. Accordingly, the probability of reading an unintended original document can be reduced by permitting the execution of the Pull Scan function on condition that the Pull Scan screen 410 is displayed by the operation unit 107.

The operation procedure when the user uses the Pull Scan function has been described above with reference to FIGS. 4A and 4B. The probability that the printing apparatus 100 reads an original document that the user does not intend to scan can be reduced, by permitting the execution of the Pull Scan function on condition that the operation unit 107 displays the Pull Scan screen 410. However, this method requires the user to display the Pull Scan screen 410 when the user uses the Pull Scan function, which can consume additional time of the user. Besides, some users may not know about the operation procedure described above with reference to FIGS. 4A and 4B. Therefore, in the present exemplary embodiment, in addition to a first use procedure described above with reference to FIGS. 4A and 4B, a second use procedure is provided to the user. The second use procedure permits users to execute the Pull Scan function without displaying a specific screen such as the Pull Scan screen 410.

The second use procedure will be described in detail below in comparison with the first use procedure, referring to a sequence diagram in each of FIGS. 5A and 5B. First, the first use procedure will be described again, with reference to FIG. 5A.

In step S501, the user sets an original document on the scanner 106 of the printing apparatus 100. Next, in step S502, the user displays the Pull Scan screen 410 as illustrated in FIG. 4B. After causing the printing apparatus 100 to display the Pull Scan screen 410, the user returns to the PC 120. In step S503, the user gives the instruction to execute the Pull Scan function from the PC 120. After the user gives the instruction to execute the Pull Scan function from the PC 120, then in step S504, the PC 120 transmits an execution instruction for the Pull Scan function, to the printing apparatus 100 via the network 110.

In step S505, upon receiving the execution instruction for the Pull Scan function, the printing apparatus 100 determines whether the Pull Scan function is executable. More specifically, in step S505, the printing apparatus 100 determines whether the operation unit 107 displays the Pull Scan screen 410. This determination executed in step S505 will be described again in detail below, with reference to a flowchart in each of FIGS. 7 and 8 to be described below. If the operation unit 107 displays the Pull Scan screen 410, then in step S505, the printing apparatus 100 determines that the Pull Scan function is executable. Then in step S506, the printing apparatus 100 reads the original document. Next, in step S507, the printing apparatus 100 transmits an original document image generated by reading the original document, to the PC 120.

Next, the second use procedure will be described with reference to FIG. 5B. In step S511, the user sets the original document on the scanner 106 of the printing apparatus 100. After setting the original document, the user can return to the PC 120 without displaying the Pull Scan screen 410 as illustrated in FIG. 4B, unlike the first use procedure described with reference to FIG. 5A. In step S512, after returning to the PC 120, the user gives the instruction to execute the Pull Scan function, in the PC 120. After the user gives the instruction to execute the Pull Scan function in the PC 120, the PC 120 transmits, in step S513, an execution instruction for the Pull Scan function, to the printing apparatus 100 via the network 110.

In step S514, upon receiving the execution instruction for the Pull Scan function, the printing apparatus 100 determines whether the Pull Scan function is executable. The determination executed in step S514 is different from the determination executed in step S505 in the first use procedure described with reference to FIG. 4A. In step S514, when a screen displayed by the operation unit 107 is a specific screen such as the menu screen 200, the copy screen 300, or the send screen 320, it is determined that the Pull Scan function is executable. As compared with the determination in step S505, the number of screens based on which the execution of the Pull Scan function is permitted is greater. If it is determined that the Pull Scan function is executable in step S514, then in step S515, the original document is read. Next, in step S516, the printing apparatus 100 transmits an original document image generated by reading the original document, to the PC 120.

In the second use procedure, the user may display the Pull Scan screen 410 as illustrated in FIG. 4B, in a manner similar to the first use procedure. In this case as well, when the operation unit 107 displays the Pull Scan screen 410, it is determined in step S514 that the Pull Scan function is executable.

In the second use procedure in FIG. 5B, the operation unit 107 may display nothing because the printing apparatus 100 has shifted into a power save mode. In other words, no screen may be displayed by the operation unit 107. The execution of the Pull Scan function is also permitted when no screen is displayed by the operation unit 107.

According to the second use procedure illustrated in FIG. 5B, the user is free from the operation for displaying a specific screen such as the Pull Scan screen 410, when using the Pull Scan function. In addition, the second use procedure allows a user to use the Pull Scan function, even if the user is unfamiliar with an operation procedure of "displaying the Pull Scan screen 410," which is necessary for the first use procedure in FIG. 5A.

When the operation unit 107 displays a screen where various kinds of settings are provided, such as the copy setting screen 310 or the send setting screen 330, the printing apparatus 100 is likely being operated by a user different from the user who is about to use the Pull Scan function. In such a case, if the Pull Scan function is executed, an original document not intended by the user who is about to use the Pull Scan function, may be unintentionally read. Then, according to the second use procedure of the present exemplary embodiment, when the operation unit 107 displays a screen where various kinds of setting are provided, such as the copy setting screen 310 or the send setting screen 330, the printing apparatus 100 does not execute the Pull Scan function even if the printing apparatus 100 receives an execution instruction for the Pull Scan function. The determination made in step S514 will be described again in detail below, with reference to the flowchart in each of FIGS. 7 and 8 to be described below. The second use procedure allows automatic execution of the Pull Scan function, even if the Pull Scan screen 410 is not displayed. Accordingly, the second use procedure may be referred to below as "automatic Pull Scan".

As described above with reference to FIGS. 5A and 5B, two methods, namely, the first use procedure described with reference to FIG. 5A and the second use procedure (the automatic Pull Scan) described with reference to FIG. 5B, can be provided to the user as a method for executing the Pull Scan function in the present exemplary embodiment. The printing apparatus 100 of the present exemplary embodiment allows the user to select whether the first use procedure or the second use procedure is to be used, and then to set the selected procedure as a device setting. This setting will be described with reference to FIGS. 6A, 6B, and 6C.

A setting screen 600 in FIG. 6A is displayed by the operation unit 107 in response to user's selection of the button 204 in the menu screen 200 as illustrated in FIG. 2. In the setting screen 600, the user can make various settings, such as a setting for paper to be used for printing and setting for a network.

When the user selects a button 601 in the setting screen 600, the operation unit 107 displays a setting screen 610 as illustrated in FIG. 6B. The setting screen 610 is provided for the user to set whether the automatic Pull Scan is to be enabled or disabled, as a device setting of the printing apparatus 100. When the automatic Pull Scan is set to be disabled, the printing apparatus 100 selects the first use procedure described with reference to FIG. 5A, as the method for executing the Pull Scan function. On the other hand, when the automatic Pull Scan is set to be enabled, the printing apparatus 100 selects the second use procedure described with reference to FIG. 5B, as the method for executing the Pull Scan function. The setting screen 610 as illustrated in FIG. 6B represents a case where the automatic Pull Scan is set to be disabled. The user may only select a button 611 to enable the automatic Pull Scan. When the user selects the button 611, the operation unit 107 displays a setting screen 620 as illustrated in FIG. 6C. The setting screen 620 as illustrated in FIG. 6C represents a case where the automatic Pull Scan is set to be enabled.

The probability that the printing apparatus 100 reads an original document that the user using the Pull Scan function does not intend to scan can be reduced, by causing the printing apparatus 100 to display a specific screen such as the Pull Scan screen 410. When it is desired to give a priority to reducing the probability of reading an unintended original document, the automatic Pull Scan may be set to be disabled. On the other hand, when it is desired to reduce inconvenience in using the Pull Scan function as much as possible, or when there are many users who are unfamiliar with the first use procedure described with reference to FIG. 5A, the automatic Pull Scan may be set to be enabled. In this way, for example, a system administrator can appropriately select whether the automatic Pull Scan is to be enabled or disabled, depending on a use environment or a purpose of a user, and then set a result of this selection.

Figure 7:
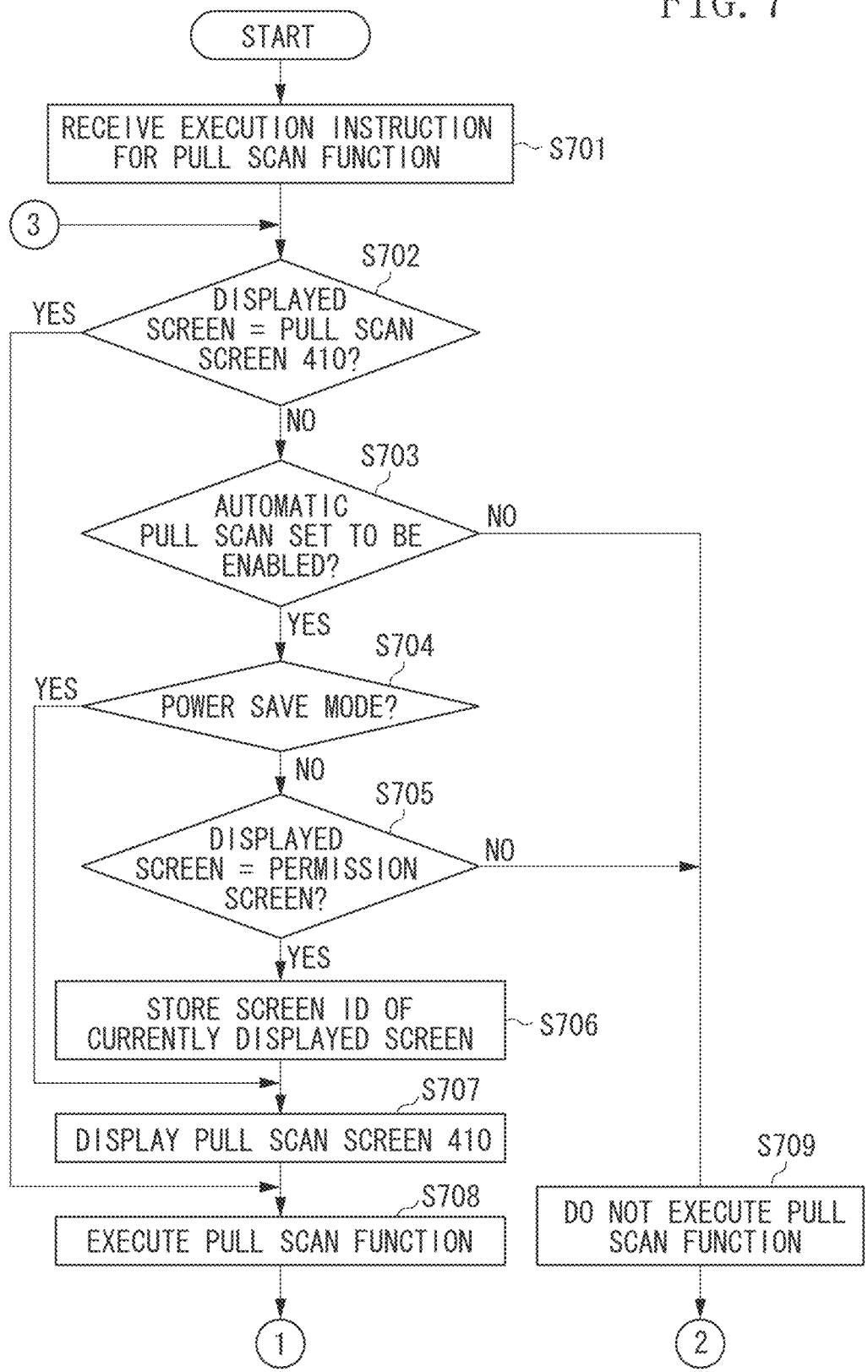
FIG. 7 is a flowchart illustrating processing to be executed by the printing apparatus.
Figure 8:
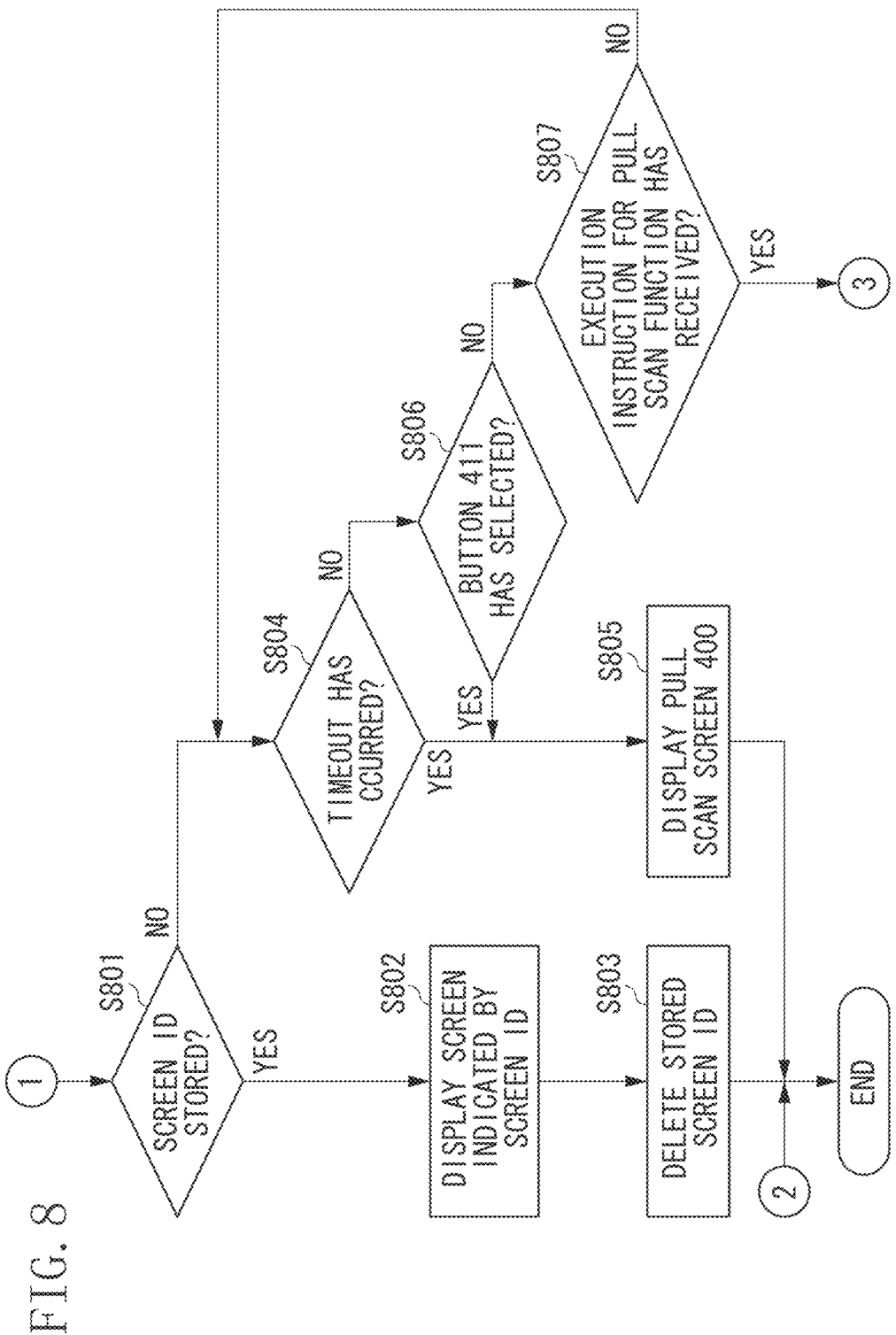
FIG. 8 is a flowchart illustrating processing to be executed by the printing apparatus.

Next, regarding the execution of the Pull Scan function, processing to be executed by the printing apparatus 100 will be described with reference to the flowchart of each of FIGS. 7 and 8. The CPU 101 reads a control program stored in a memory such as the ROM 102, and executes the read control program by decompressing the programs into the RAM 103, to process each step in the flowchart of each of FIGS. 7 and 8. In addition, the automatic Pull Scan is set beforehand as enabled or disabled via the setting screen described with reference to FIGS. 6A to 6C. A result of the setting is stored in a storage area such as the HDD 104.

First, in step S701, the network I/F 108 of the printing apparatus 100 receives an execution instruction for the Pull Scan function, transmitted from an external apparatus such as the PC 120. The execution instruction received in step S701 includes various setting information such as a resolution in reading an original document and a format of an original document image.

Next, in step S702, the CPU 101 of the printing apparatus 100 determines whether the screen displayed by the operation unit 107 is the Pull Scan screen 410 described with reference to FIG. 4B. When the operation unit 107 displays a specific screen such as the Pull Scan screen 410, execution of the Pull Scan function is permitted regardless of the setting of the automatic Pull Scan as illustrated in FIGS. 6A to 6C. When the CPU 101 determines that the operation unit 107 is displaying the Pull Scan screen 410 (Yes in step S702), the processing proceeds to step S708. In step S708, the CPU 101 executes the Pull Scan function according to the execution instruction received in step S701. More specifically, the scanner 106 reads an original document according to the setting information included in the execution instruction received in step S701, and then the network I/F 108 transmits an original document image generated by reading the original document, to an external apparatus that is a sender of the execution instruction.

On the other hand, when the CPU 101 determines in step S702 that the operation unit 107 is not displaying the Pull Scan screen 410 (No in step S702), the processing proceeds to step S703. In step S703, the CPU 101 determines whether the automatic Pull Scan is set to be enabled. The CPU 101 makes this determination by referring to information stored in a storage area such as the HDD 104. When the CPU 101 determines in step S703 that the automatic Pull Scan is set to be disabled (No in step S703), the processing proceeds to step S709. In step S709, the CPU 101 does not execute the Pull Scan function, and the processing represented by the flowchart ends.

On the other hand, when the CPU 101 determines in step S703 that the automatic Pull Scan is set to be enabled (Yes in step S703), the processing proceeds to step S704. In step S704, the CPU 101 determines whether the printing apparatus 100 is in operation in the power save mode. The printing apparatus 100 according to the present exemplary embodiment displays no screen when operating in the power save mode, and displays a screen when not operating in the power save mode, i.e., when operating in a normal power mode. When the CPU 101 determines in step S704 that the printing apparatus 100 is in operation in the power save mode (Yes in step S704), the processing proceeds to step S707. On the other hand, when the CPU 101 determines in step S704 that the printing apparatus 100 is not in operation in the power save mode (No in step S704), the processing proceeds to step S705.

Step S705 will be described. In step S705, the CPU 101 determines whether the operation unit 107 is displaying a permission screen. The permission screen according to the present exemplary embodiment is an all-inclusive term for screens in which execution of the Pull Scan function is permitted if the automatic Pull Scan is set to be enabled. According to the present exemplary embodiment, for example, the menu screen 200 and the copy screen 300 are classified as the permission screen. A permission screen table 900 as illustrated in FIG. 9 stores screen IDs of the screens that are classified as the permission screen, and is stored in a storage area such as the HDD 104. According to the present exemplary embodiment, whether to execute the Pull Scan function is determined based on whether the operation unit 107 displays a screen having a screen ID stored in the permission screen table 900.

For example, when the operation unit 107 displays the copy setting screen 310 or the send setting screen 330, neither of these screens are stored in the permission screen table 900, and therefore, the CPU 101 determines in step S705 that the screen displayed by the operation unit 107 is not the permission screen (No in step S705). Then, the processing proceeds to step S709. In step S709, the CPU 101 does not execute the Pull Scan function, and the processing represented by this flowchart ends.

On the other hand, when, for example, the operation unit 107 displays the permission screen such as the menu screen 200 and the copy screen 300, the CPU 101 determines in step S705 that the screen displayed by the operation unit 107 is a permission screen (Yes in step S705). Then, the processing proceeds to step S706.

Next, in step S706, the CPU 101 temporarily stores the screen ID of the screen currently displayed by the operation unit 107 in a memory such as the HDD 104 and the RAM 103. Subsequently, in step S707, the CPU 101 controls the operation unit 107 so as to display the Pull Scan screen 410 as illustrated in FIG. 4B. Here, even if a user different from the user using the Pull Scan function tries to use the printing apparatus 100, this different user can be notified that the Pull Scan function is being used by display of the Pull Scan screen 410 as illustrated in FIG. 4B. Meanwhile, a purpose of storing the screen ID in step S706 is to restore a previous screen if the displayed screen is changed by a process in step S707. After the process in step S707 is executed, the processing proceeds to step S708. In step S708, the CPU 101 executes the Pull Scan function according to the execution instruction received in step S701.

Next, processing after the Pull Scan function is executed will be described with reference to the flowchart of FIG. 8. After the execution of the Pull Scan function is completed (transmission of the original document image is completed) in step S708, the processing proceeds to step S801. In step S801, the CPU 101 determines whether a screen ID is stored in the memory such as the HDD 104 and the RAM 103. When the screen ID is temporarily stored in step S706, the CPU 101 determines in step S801 that the screen ID is stored (Yes in step S801), and the processing proceeds to step S802.

In step S802, the CPU 101 controls the operation unit 107 so as to display a screen indicated by the screen ID. According to the present exemplary embodiment, the displayed screen is temporarily changed to the Pull Scan screen 410 in step S707. Execution of the process in step S802 can restore the screen currently displayed by the operation unit 107 to the screen displayed before the change. After completion of the process in step S802, the processing proceeds to step S803. In step S803, the CPU 101 deletes the screen ID temporarily stored in the memory such as the HDD 104 and the RAM 103.

On the other hand, when the Pull Scan function is carried out without execution of the process in step S706, the CPU 101 determines in step S801 that no screen ID is stored (No in step S801), and the processing proceeds to step S804. In step S804, the CPU 101 determines whether a timeout has occurred. According to the present exemplary embodiment, a timer starts counting when transmission of the original document image is completed. If a predetermined time set in the printing apparatus 100 has passed, the CPU 101 determines in step S804 that the timeout has occurred (Yes in step S804). Then, the processing proceeds to step S805. In step S805, the CPU 101 controls the operation unit 107 so as to display the Pull Scan screen 400 as illustrated in FIG. 4A. The user can freely set a period of time for determining the timeout, including 0 second. When 0 second is set as the period of time for determining the timeout, the process in step S805 is executed immediately after the transmission of the original document image is completed.

In step S804, when the CPU 101 determines that no timeout has occurred (No in step S804), the processing proceeds to step S806. In step S806, the CPU 101 determines whether the button 411 in the Pull Scan screen 410 has been selected by the user. When the CPU 101 determines in step S806 that the button 411 of the Pull Scan screen 410 has been selected by the user (Yes in step S806), the processing proceeds to step S805. In step 805, the CPU 101 controls the operation unit 107 so as to display the Pull Scan screen 400 as illustrated in FIG. 4A. On the other hand, when the CPU 101 determines in step S806 that the button 411 of the Pull Scan screen 410 has not been selected by the user (No in step S806), the processing proceeds to step S807.

In step S807, the CPU 101 determines whether an instruction for executing the Pull Scan function has been received from an external apparatus such as the PC 120. When the network I/F 108 has received the instruction for executing the Pull Scan function (Yes in step S807), the processing returns to step S702, to execute the Pull Scan function. On the other hand, when the network I/F 108 has received no execution instruction for the Pull Scan function (No in step S807), the processing returns to step S804.

As described above, according to the present exemplary embodiment, there are the first use procedure for the user which needs to display a specific screen (the Pull Scan screen 410 according to the present exemplary embodiment), and the second use procedure for the user which does not need to display a specific screen. These procedures can be provided to the user when the user uses the Pull Scan function. In addition, according to the present exemplary embodiment, for example, the system administrator can appropriately select whether the first or second use procedure is to be used, depending on a use environment or a purpose of a user, and then set the selected procedure as a device setting.

Other Embodiments

The present invention can be also carried out through the processing in which a program implementing one or more functions of the above-described exemplary embodiment is supplied to a system or apparatus via a network or storage medium, and one or more processors in the system or apparatus read the program and then execute the read program. Moreover, the present invention can be also realized by a circuit (e.g., an application-specific integrated circuit (ASIC)) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-135383, filed Jun. 30, 2014, which is hereby incorporated by reference herein in its entirety.

What is claimed is:

1. An image processing apparatus that includes a copy function for scanning a document and printing an image based on image data generated by scanning the document, and a sending function for scanning a document and sending image data generated by scanning the document, the image processing apparatus comprising:
    a scanner;
    a display; and
    a controller configured to cause the image processing apparatus to execute a pull scanning process for scanning a document by the scanner according to an instruction from an external apparatus via a network and transmitting image data obtained by scanning the document to the external apparatus,
    wherein, in a case where a scanning screen on which the image processing apparatus executes the pull scan processing is displayed on the display, the controller causes the image processing apparatus to execute the pull scanning process according to the instruction,
    wherein, in a case where the instruction is received when a first screen, which is different from the scanning screen, is displayed on the display, the controller causes the image processing apparatus to execute the pull scanning process according to the instruction,
    wherein, in a case where the instruction is received from the external apparatus when a second screen, which is different from the first screen, is displayed on the display, the pull scanning process is not executed, and
    wherein the first screen is a menu screen for selecting a button by a user from among a plurality of buttons including a first button by which the display displays a copy screen for receiving setting of the copy function and a second button by which the display displays a sending screen for receiving setting of the sending function.

2. The image processing apparatus according to claim 1, further comprising a storage configured to store screen identification information as information of a permitted screen on which executing of the pull scanning process is permitted,
    wherein, in a case where screen identification information of a screen displayed on the display is stored as the information of the permitted screen in the storage, the controller executes the pull scanning process according to the scan instruction from the external apparatus.

3. The image processing apparatus according to claim 1, wherein the controller is configured to cause the display to display a selecting screen for a user to select whether to execute the pull scanning process according to the instruction from the external apparatus while the first screen is displayed.

4. The image processing apparatus according to claim 1, wherein the controller executes the pull scanning process according to the instruction from the external apparatus when the image processing apparatus is in a power saving mode.

5. The image processing apparatus according to claim 1, wherein the display changes the first screen to the scanning screen in a case where the instruction is received when the first screen, which is different from the scanning screen, is displayed on the display.

6. The image processing apparatus according to claim 1,
    wherein the controller is configured to determine, using a screen identification, a screen which is displayed on the display,
    wherein, in a case where the instruction is received and it is determined that the first screen is displayed on the display, the controller causes the image processing apparatus to execute the pull scanning process according to the instruction, and
    wherein, in a case where the instruction is received from the external apparatus and it is determined that the second screen is displayed on the display, the pull scanning process is not executed.

7. The image processing apparatus according to claim 1, wherein, when the display displays the menu screen, the controller does not receive a setting of the copy function or the sending function.

8. A control method for controlling an image processing apparatus that includes a scanner, a display, a copy function for scanning a document and printing an image based on image data generated by scanning the document, a sending function for scanning a document and sending image data generated by scanning the document, and a controller configured to cause the image processing apparatus to execute a pull scanning process for scanning a document by the scanner according to an instruction from an external apparatus via a network and transmitting image data obtained by scanning the document to the external apparatus, the control method comprising:
    causing, via the controller and in a case where a scanning screen on which the image processing apparatus executes the pull scan processing is displayed on the display, the image processing apparatus to execute the pull scanning process according to the instruction;
    causing, via the controller and in a case where the instruction is received when a first screen which is different from the scanning screen, is displayed on the display, the image processing apparatus to execute the pull scanning process according to the instruction; and
    causing, in a case where the instruction is received from the external apparatus when a second screen, which is different from the first screen, is displayed on the display, the pull scanning process not to bet executed, wherein the first screen is a menu screen for selecting a button by a user from among a plurality of buttons including a first button by which the display displays a copy screen for receiving setting of the copy function and a second button by which the display displays a sending screen for receiving setting of the sending function.

* * * * *